Figure 1:
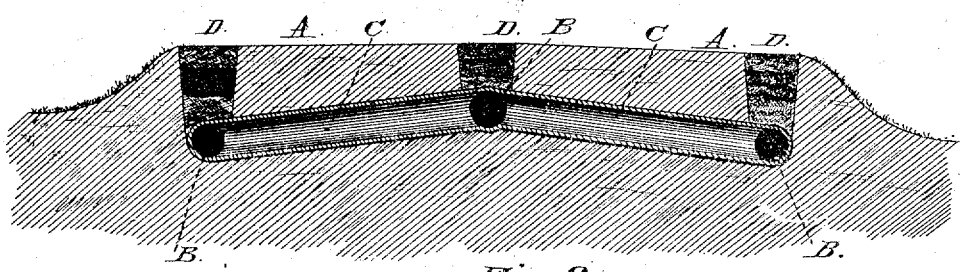

W. B. HENNING,

Assignor of one-fourth to J. B. CASEBEER & T. G. MATHENY.

MODE OF CONSTRUCTING ROADS, SIDEWALKS, &c.

No. 10,388. Reissued Sept. 25, 1883.

WITNESSES:

Fred. L. Dieterich

Earl H. Henning

INVENTOR.

Wm. B. Henning,

ATTORNEYS

UNITED STATES PATENT OFFICE.

WILLIAM B. HENNING, OF WATERLOO, ASSIGNOR OF ONE-FOURTH INTEREST TO JACOB B. CASEBEER AND TIMOTHY G. MATHENY, OF AUBURN, IND.

MODE OF CONSTRUCTING ROADS, SIDEWALKS, &c.

SPECIFICATION forming part of Reissued Letters Patent No. 10,383, dated September 25, 1883.

Original No. 245,721, dated August 16, 1881. Application filed March 10, 1883.

*To all whom it may concern:*

Be it known that I, WILLIAM B. HENNING, of Waterloo, in the county of DeKalb and State of Indiana, have invented a new and useful Mode of Constructing Roads, Thoroughfares, Drives, Sidewalks, and Railway Road-Beds; and I do hereby declare the following to be a full, clear, and exact description of the same.

My invention consists in a system of grading, draining, and aerating roads, streets, drives, sidewalks, and railway road-beds.

The first part of my invention relates to the combination, with a road or other thoroughfare, of drain-pipes and connections in such a manner that immediate drainage may be secured by allowing the surface-water, and also the water in the soil and subsoil contiguous to the road-bed, to escape into the said drain-pipes.

The second part of my invention relates to the combination, with a "pipe-line" road or other thoroughfare, of aerating connection-chambers so arranged as to admit air and heat, and which also serve as inspection-boxes and silt-deposits.

The third part of my invention relates to the combination, with a road or other thoroughfare having a system of drain-pipes and aerating connection-chambers, of filtering-sections along and under the said road-surface and over the said drain-pipes, in order to more quickly admit surface-water into the said drain-pipes. I favor the form of a flat or slightly-crowned road-surface, which combines economy, durability, comfort, and safety. A sharply-convexed road is uncomfortable to the driver, fatiguing to the team, and dangerous in time of mud or ice. A road having a substantially flat surface is more durable, less expensive to build, safer to travel, and obviates the necessity of deep gutters.

My improvement in road construction, &c., involves a radical departure in the manner and principle of draining roads, &c., and keeping the road-bed dry; and the invention consists, broadly, in a system of drain-pipes placed underneath the road surface longitudinally, with cross-drains at intervals, as required, for discharge, said pipes being connected by aerating and connecting chambers of any form and material that will contribute to the desired result. The longitudinal pipe-lines are placed parallel with and extend along under the surface of the road or thoroughfare, said lines of pipe being more or less in number, as the width of road or street may require. If three lines of pipe are used, one is placed under the center of the roadway. The other two are placed a little deeper than the center drain, in order to draw all water from the road-center. They should be placed under each side of the road-bed at a certain distance between the road-center and the side ditches. The water thus drawn from the road-surface escapes down through the porous earth, or through filters, into the drain-pipes at the orifices and joints of the said drain-pipes, and is conducted to the outlets for discharging the water from the road. The cross-pipes are used for receiving and discharging water from the longitudinal drain-pipes. The said pipe-lines and cross-pipes are all connected by means of aerating and connecting chambers, part or all of which may serve for catch-basins. The cuts or ditches in which the pipes are laid should be filled with porous earth or gravel, or any material that will serve as a filter and form a solid road-bed. For best results in my plan of road construction the ground should be dry enough to work without "puddling" or "tempering."

The above-described system of drains, filtering-channels, and connections causes all surface-water to immediately sink into the drain-pipes, from whence it is conducted into the sewers, channels, or water-courses. The pipe-lines, being placed inside or between the surface-gutters of the road, cut off the capillary absorption of the water from the gutters aforesaid, which, under the present general plan of roads, causes more mud than the water which falls upon the road-surface. All roads having open ditches only are kept wet and muddy by reason of such ditches becoming obstructed. The capillary action of the ground absorbs the water thus held, keeping the roadway impaired and travel impeded. A road or thoroughfare constructed substantially according to my pipe-line plan will keep in comparatively good condition in all seasons of the year, and the same plan applied in the construction of city thoroughfares will make a safe and secure road-bed for any kind of pavement, and the road or street can be kept dry at all times by means of the aerating-chambers, so regulated that hot air or steam can be forced through the pipes to melt snow or dry up moisture, thereby securing sanitary improvement as well as convenience. The aforesaid system of pipe-lines in race-tracks or driving-parks will insure a safe and dry track, avoiding and preventing accidents and delay of races, the results of wet weather. The said system of pipe-lines applied in the construction of railroads will keep the road-bed dry, thereby preventing frost or ice heaving up the ties. A broken rail is in most cases the result of ice under the road-bed, which my plan is intended to prevent. It will also preserve ties from early rot by keeping them dry, and will secure a dry and solid foundation for laying down metallic or patent ties, and will greatly reduce the expenses of repairs in railway road-beds which are loosened by spring thaws and heavy traffic.

The aforesaid plan of road-bed or thoroughfare may be made having filtering-sections of gravel, slag, broken rock, &c.; or the cuts above the pipes may be filled with common road material.

Figure 2:
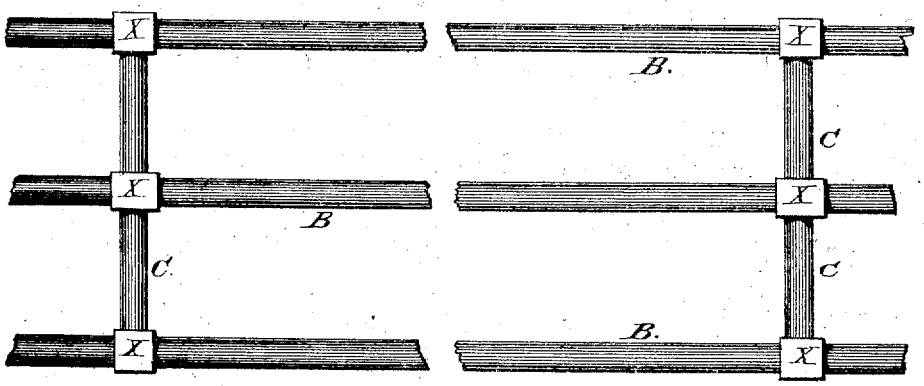
Figure 3:
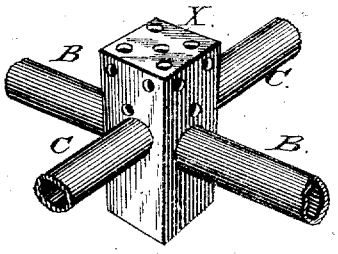

In the accompanying drawings, Figure 1 is a transverse section, the aerating connecting-chambers being omitted for convenience of representation. Fig. 2 is a plan of pipes and connecting-chambers, showing arrangement beneath the roadway. Fig. 3 is a perspective view, showing a connecting-chamber in position.

Similar letters refer to similar parts throughout the several views.

A shows the surface or track. B shows the longitudinal parallel pipes. C shows the cross pipes. D shows the cuts or ditches for laying down the pipes. X shows the vertical aerating connecting-chambers. The vertical chambers, which are shown in Fig. 3, and otherwise represented by letter X, should be placed in such manner as not to be an obstruction in driving, and so that the apertures shall not be readily closed or choked up. By this means the said chambers form safe connection for the pipes, deposit all sediment of the drains, show the condition of the drains, and aerate the pipe-lines, which will cause a speedy evaporation of moisture, and facilitate the flow of water by relieving the vacuum in the pipes.

I do not limit myself to any particular number of pipe-lines; neither do I restrict myself to any particular construction of the connections, chambers, aerators, and filters as herein shown and described; but my invention consists, broadly, in the arrangement and combination of the pipe-lines, and aerating and connecting chambers, located substantially as above described, in connection with a road, track, sidewalk, or road-bed.

I claim as my invention and desire to secure by Letters Patent—

1. The combination, with a road or other thoroughfare, of a drain pipe or pipes arranged longitudinally underneath the surface of the road to drain the same by percolation, substantially as set forth, and for the purposes specified.

2. The combination, with a road or other thoroughfare having a system of pipe-lines thereunder, of aerating and connecting chambers for the said pipe lines, by which means the said pipes may serve as aerating pipe-lines, and also as heating pipe-lines, by the introduction of hot air or steam therein, substantially as described, and for the purposes set forth.

3. The combination, with a road or other thoroughfare having a system of drain-pipes and aerating and connecting chambers, of filtering-sections along and underneath the said road-surface and over the said pipe-lines, substantially as and for the purposes set forth.

WILLIAM B. HENNING.

Witnesses:

EARL W. HENNING.

RALPH ELVERTON.